US005727219A

United States Patent [19]
Lyon et al.

[11] Patent Number: 5,727,219
[45] Date of Patent: Mar. 10, 1998

[54] VIRTUAL INPUT/OUTPUT PROCESSOR UTILIZING AN INTERRUPT HANDLER

[75] Inventors: Thomas L. Lyon, Palo Alto; Sun-Den Chen, San Jose, both of Calif.; William Joy, Aspen, Colo.; Leslie D. Kohn, Fremont, Calif.; Charles E. Narad, Santa Clara, Calif.; Robert Yung, Fremont, Calif.

[73] Assignee: Sun Microsystems, Inc., Mountain View, Calif.

[21] Appl. No.: 854,113

[22] Filed: May 9, 1997

Related U.S. Application Data

[63] Continuation of Ser. No. 402,873, Mar. 13, 1995, abandoned.

[51] Int. Cl.⁶ .............................. G06F 9/46; G06F 13/24
[52] U.S. Cl. .................... 395/741; 395/733; 395/821; 395/868
[58] Field of Search ........................ 395/733, 734, 395/735, 739, 741, 821, 868, 742, 670

[56] References Cited

U.S. PATENT DOCUMENTS

| 3,648,252 | 3/1972 | Thron et al. | 395/650 |
| 3,905,025 | 9/1975 | Davis et al. | 395/732 |
| 4,275,440 | 6/1981 | Adams, Jr. et al. | 395/868 |
| 4,764,869 | 8/1988 | Miyazaki et al. | 395/375 |
| 4,847,752 | 7/1989 | Akashi | 395/868 |
| 5,101,497 | 3/1992 | Culley et al. | 395/734 |
| 5,261,107 | 11/1993 | Klim et al. | 395/739 |
| 5,381,541 | 1/1995 | Begun et al. | 395/500 |
| 5,473,757 | 12/1995 | Sexton | 364/131 |
| 5,481,725 | 1/1996 | Jayakumar et al. | 395/868 |
| 5,495,615 | 2/1996 | Nizar et al. | 395/733 |

FOREIGN PATENT DOCUMENTS

| 205949 | 12/1986 | European Pat. Off. . |
| 464615 | 8/1992 | European Pat. Off. . |

Primary Examiner—Gopal C. Ray
Attorney, Agent, or Firm—Blakely Sokoloff Taylor & Zafman

[57] ABSTRACT

A virtual I/O processor (VIOP) is implemented using a programmed I/O (PIO) unit. The PIO unit is complemented by a VIOP interrupt, a VIOP interrupt handler, and a number of VIOP data structures. Preferably, the PIO unit is further complemented with a set of dedicated I/O global registers, a number of VIOP library read/write routines for various I/O device types, and non-blocking read and write operations. During execution, these elements cooperate with each other to perform multiple sequences of programmed I/Os as if they were being performed by a dedicated I/O processor.

20 Claims, 7 Drawing Sheets

VIRTUAL INPUT/OUTPUT PROCESSOR UTILIZING AN INTERRUPT HANDLER

This is a continuation of application Ser. No. 08/402,873, filed Mar. 13, 1995, now abandoned.

BACKGROUND OF THE INVENTION

1. Field of the Invention

The present invention relates to the field of computer systems. More specifically, the present invention relates to input/output (I/O) methods and apparatus of computer systems.

2. Background

Programmed I/O (PIO) under the complete control of the central processing unit (CPU), as opposed to direct memory access (DMA) or dedicated I/O processor, is well known in the art. Under such technique, the CPU stalls for the completion of an access to an I/O device. Since I/O access tends to have a high latency compared to CPU cycle time, programmed I/O has the disadvantage of wasting CPU cycles. The disadvantage is especially aggravating for the modern processors running much faster than the average access time to the I/O devices. Each programmed I/O access to an I/O device could easily waste hundreds of CPU clock cycles. The situation becomes worse as the discrepancy between CPU cycle time and I/O access time becomes larger.

Hardware optimizations such as store buffers have been used to reduce the overhead of programmed I/O accesses. The CPU can continue its execution of other programs after a store operation is correctly issued. The store buffer approach typically improves programmed I/O write performance, but does not alleviate the latency problem for programmed I/O read operations. Another approach is the employment of an I/O processor dedicated to performing programmed high level I/O operations. The I/O processor interprets and executes the high level commands received from the CPU, thereby freeing the CPU, allowing it to continue execution of other programs. The I/O processor can report the status through some pre-defined mechanisms upon the completion of command execution. Unfortunately, the dedicated I/O processor approach is inherently costly.

Thus, it is desirable to be able to support data transfers to and from I/O devices without wasting a lot of CPU cycles nor incurring expensive hardware costs. As will be disclosed, the present invention provides a virtual I/O processor which achieves the objects and desired results described earlier.

SUMMARY OF THE INVENTION

The desired results of supporting programmed I/O without wasting a lot of CPU cycles, nor incurring expensive hardware cost, are advantageously achieved by implementing a virtual I/O processor (VIOP), using a programmed I/O (PIO) unit. The PIO unit is complemented by a VIOP interrupt, a VIOP interrupt handler, and a number of VIOP data structures. Preferably, the PIO unit is further complemented with a set of dedicated I/O global registers, a number of VIOP library read/write routines for various I/O device types, and non-blocking read and write operations. During execution, these elements cooperate with each other to perform multiple sequences of programmed I/Os as if they were being performed by a dedicated I/O processor. In one embodiment, the VIOP handler automatically reinvokes the PIO unit if the sequence of programmed I/Os has not been completed.

The PIO unit performs actual non-blocking I/O read/write accesses against the target I/O devices. The VIOP interrupt and its handler facilitate returns from the PIO unit at the completion of I/O accesses by the PIO unit. Each VIOP data structure facilitates control and data management for a sequence of programmed I/Os. The VIOP handler maintains the VIOP data structures accordingly. In one embodiment, the VIOP handler automatically reinvokes the PIO unit if the sequence of programmed I/Os has not been completed.

The preferred set of dedicated I/O global registers facilitate the transfer of I/O data between system memory and the PIO unit, as well as the performance of the programmed I/O control and data management functions.

The preferred VIOP library read/write routines perform programmed I/Os against target I/O devices of various device types, using the PIO unit and its complimentary facilities. Application programs selectively invoke the appropriate VIOP library read/write routines to perform read/write accesses against the I/O devices. In one embodiment, the VIOP library read/write routines are responsible for repetitively invoking the PIO unit if the sequence of programmed I/Os has not been completed.

BRIEF DESCRIPTION OF THE DRAWINGS

FIG. 4 also illustrates the VIOP library read/write routines, and the non-block read/write statements.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
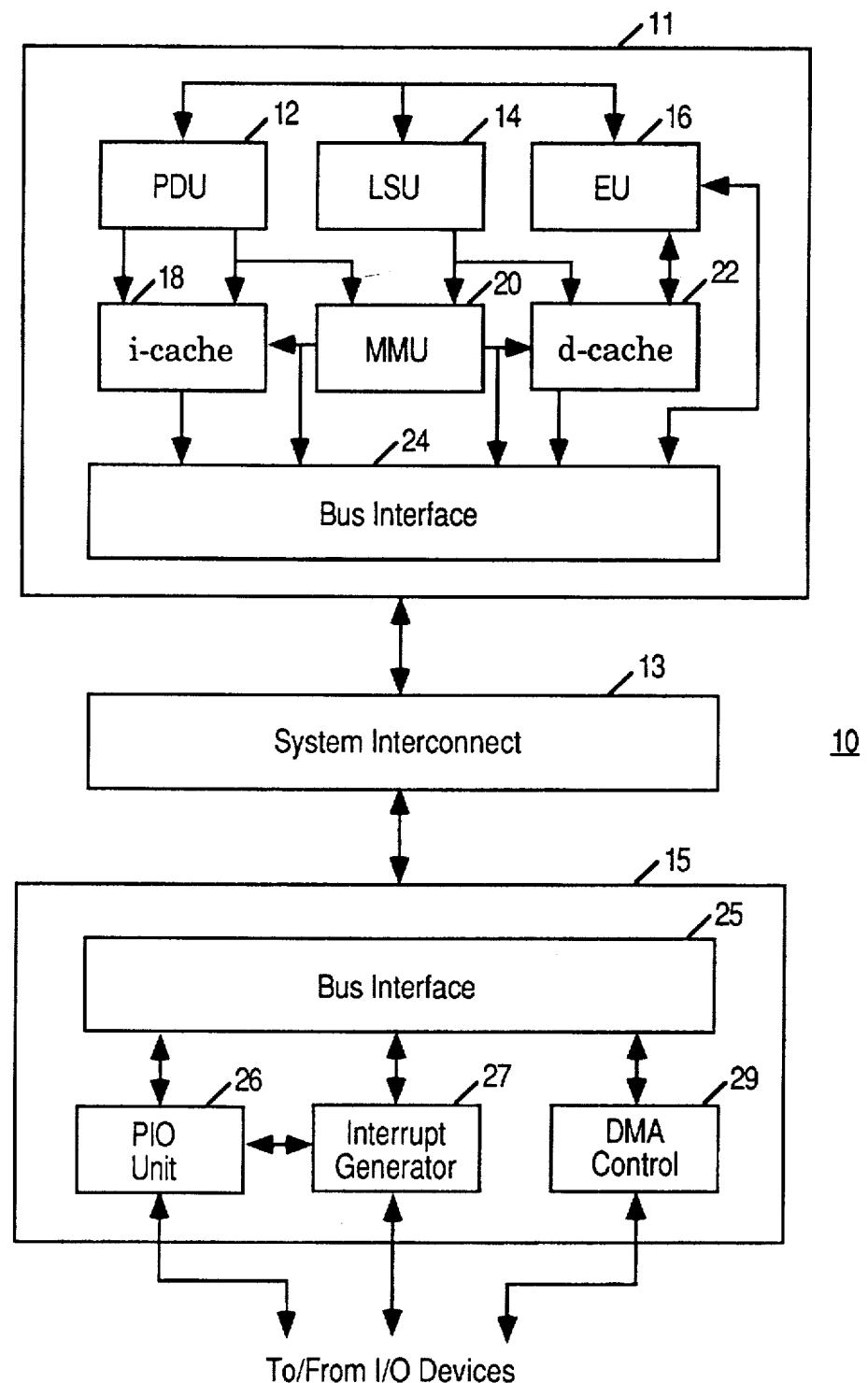
FIG. 1 is an exemplary computer system incorporating the teachings of the present invention.

Referring now to FIG. 1, a block diagram illustrating an exemplary computer system incorporating the teachings of the present invention is shown. The exemplary computer system 10 comprises a processor 11 including an instruction prefetch and dispatch unit (PDU) 12, a load/store unit (LSU) 14, and an execution unit (EU) 16 incorporated with the teachings of the present invention, coupled to each other as shown. The processor 11 further includes an instruction cache (i-cache) 18, a data cache (d-cache) 22, a memory management unit (MMU) 20, and a bus interface 24, coupled to each other, the PDU 12, the LSU 14, and the EU 16 as shown. Additionally, the computer system 10 comprises a system interconnect 13 and an I/O controller 15 including a bus interface 25, a programmed I/O unit (PIO) 26 of the present invention, an interrupt generator 27 and DMA control 29.

Cooperatively, instructions are fetched from the system memory (not shown), stored in the instruction cache 18, and dispatched to the LSU 14 and EU 16 for execution. The execution results are stored back into the data cache 22, and if applicable, to the system memory. I/O devices (not shown) are accessed through the I/O controller 15. Some I/Os are performed by programmed I/Os using the PIO unit 26 of the present invention. The PIO unit 26 performs the actual I/O accesses against the I/O devices (not shown) for programmed I/Os, and cooperates with a VIOP interrupt and a VIOP interrupt handler of the present invention, which will be described in more detail below. As will be obvious from the descriptions to follow, the PIO unit 26 can be built at a relatively low cost in terms of both circuitry and real estate required. Additionally, the present invention may be practiced with one or more PIO units 26.

Except for the teachings of the present invention incorporated in the EU 16 and the PIO unit 26 for supporting programmed I/Os, the elements illustrated in FIG. 1 are intended to represent a broad category of these elements found in most computer systems. The constitutions and basic functions are well known and will not be otherwise described further. The teachings of the present invention incorporated in the EU 16 and the PIO unit 26 will be described in further detail below with additional references to the remaining figures. The elements of the present invention will be described individually first, and then followed by the manner they cooperate with each other.

Figure 2A:
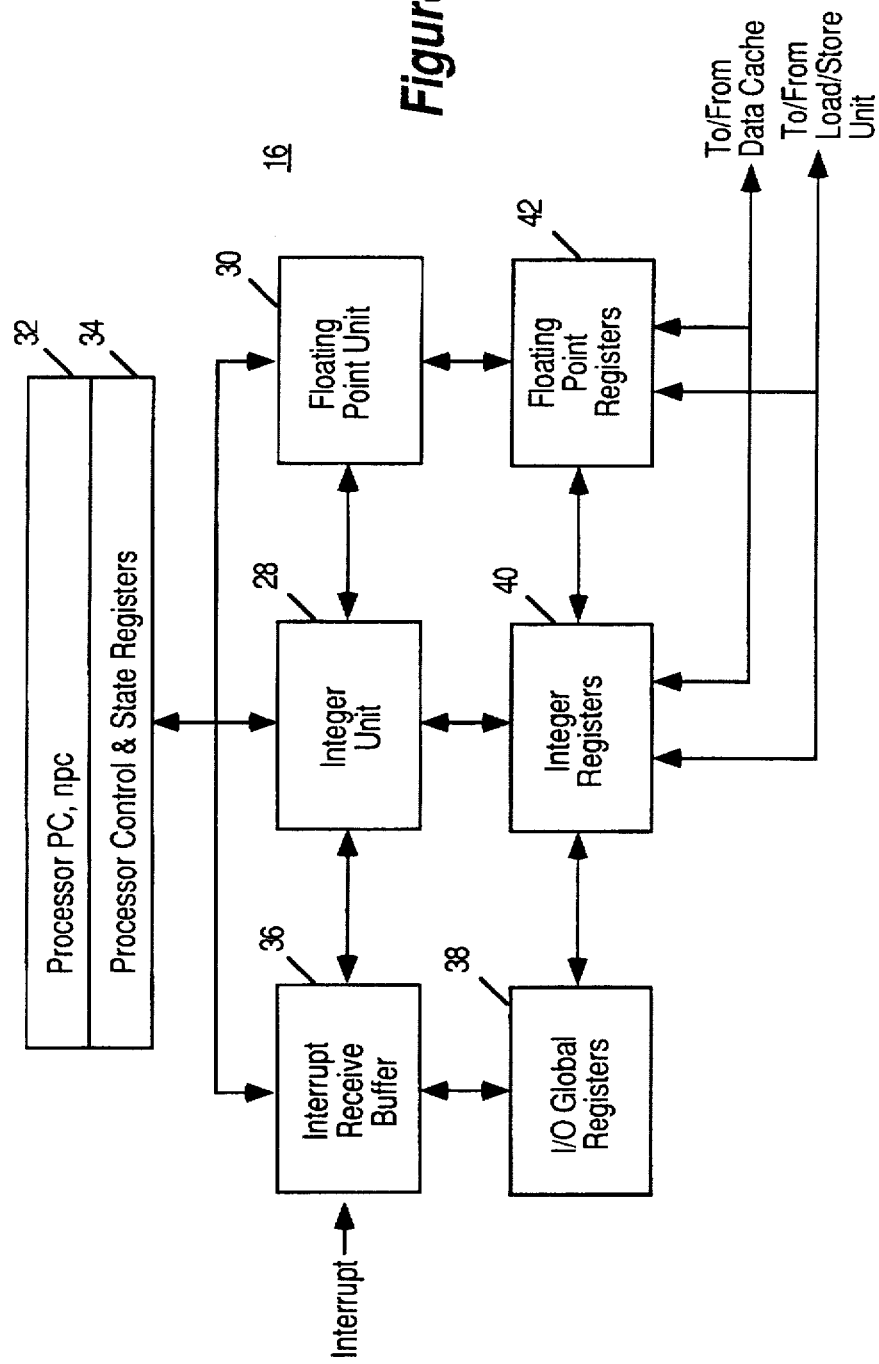
FIG. 2a illustrates the relevant portions of one embodiment of the execution unit of FIG. 1 in further detail, in particular, the preferred I/O global registers of the present invention.
Figure 2B:
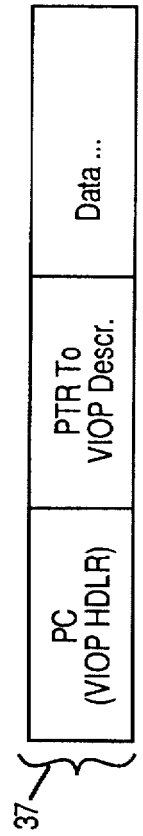
FIG. 2b illustrates an exemplary VIOP interrupt entry in the interrupt receive buffer of FIG. 1.

Referring now to FIGS. 2a–2b, two block diagrams illustrating the relevant portions of one embodiment of the execution unit of FIG. 1 in further detail is shown. The EU 16 comprises conventional elements such as a number of control and state registers 32 and 34, an integer and a floating point execution unit 28 and 30, an integer and a floating point register file 40 and 42, and an interrupt receive buffer 36. Additionally, in accordance to the present invention, the EU 16 preferably comprises a number of dedicated I/O global registers 38.

The interrupt receive buffer 36 stores received interrupts, including VIOP interrupts 37 of the present invention. VIOP interrupts are used by the PIO unit 26 to transfer execution to a VIOP interrupt handler. A VIOP interrupt 37 includes a PC 39 denoting the starting address of the VIOP interrupt handler, a pointer 41 to a VIOP descriptor and optionally, data just read from an I/O device, if the VIOP interrupt 37 was triggered as a part of a programmed read I/O. Alternatively, a pointer to be resolved indirectly, for example through a trap base register, may be used instead of PC 39. VIOP interrupt 37, VIOP interrupt handler, and VIOP descriptor will all be described in more detail below.

The preferred dedicated I/O global registers 38 facilitate I/O data transfers between the system memory and the PIO unit 26 as well as performance of control and data management functions for a sequence of programmed I/Os, which will be described in more detail below. As will be appreciated by those skilled in the art, the dedicated I/O global registers 38 are preferred for performance reasons. The provision of the dedicated I/O global registers 38 avoids having to spill a portion of the current content of the register files 40 and 42 to facilitate the above described I/O data transfers and performance of management functions.

The functions and the constitutions of the remaining control and state registers 32 and 34, the integer and floating point units 28 and 30, the integer and floating point register files 40 and 42, and the interrupt assertion and detection mechanism are all well known, and will not be further described. However, it should be noted that while the present invention is being described with the preferred dedicated I/O global registers 38 disposed as part of the EU 16, the present invention may be practiced with the preferred dedicated I/O global registers 38 disposed in other parts of the processor 11.

Figure 3:
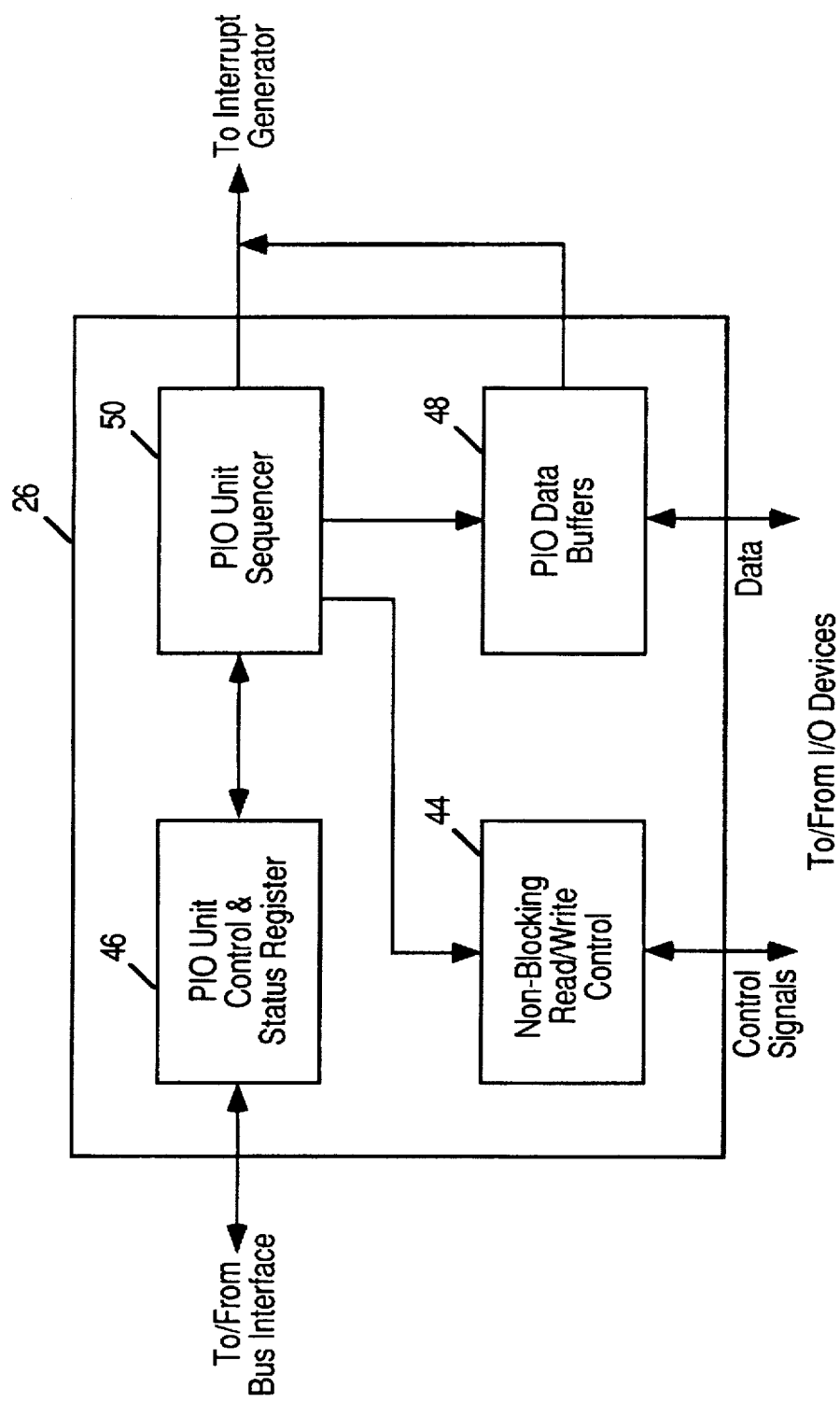
FIG. 3 illustrates the relevant portions of one embodiment of the PIO unit of FIG. 1 in further detail.

Referring now to FIG. 3, a block diagram illustrating the relevant portions of one embodiment of the PIO unit of FIG. 1 in further detail is shown. The PIO unit 26 comprises a sequencer 50, a number of data buffers 48, and a number of control and status registers 46, and non-blocking read/write control circuitry 44 coupled to each other as shown. The sequencer 50 executes a predefined sequence of operations for performing actual I/O accesses against an I/O device, after the PIO unit 26 has been allocated and properly initialized. The non-blocking read/write control circuitry 44 controls the actual non-blocking read/write from/to an I/O device. Additionally, the sequencer 50 asserts the VIOP interrupt at the completion of each I/O access. The data buffers 48 buffer the I/O data being transferred by the programmed I/Os to and from the I/O device. The control and status registers 46 store current control and status information of the PIO unit 26. Allocation and initialization of the PIO unit 26, transfer of data between the data buffers 48 and the dedicated I/O global registers 38, as well as assertion and servicing of the VIOP interrupt will also be described in more detail below.

Figure 4:
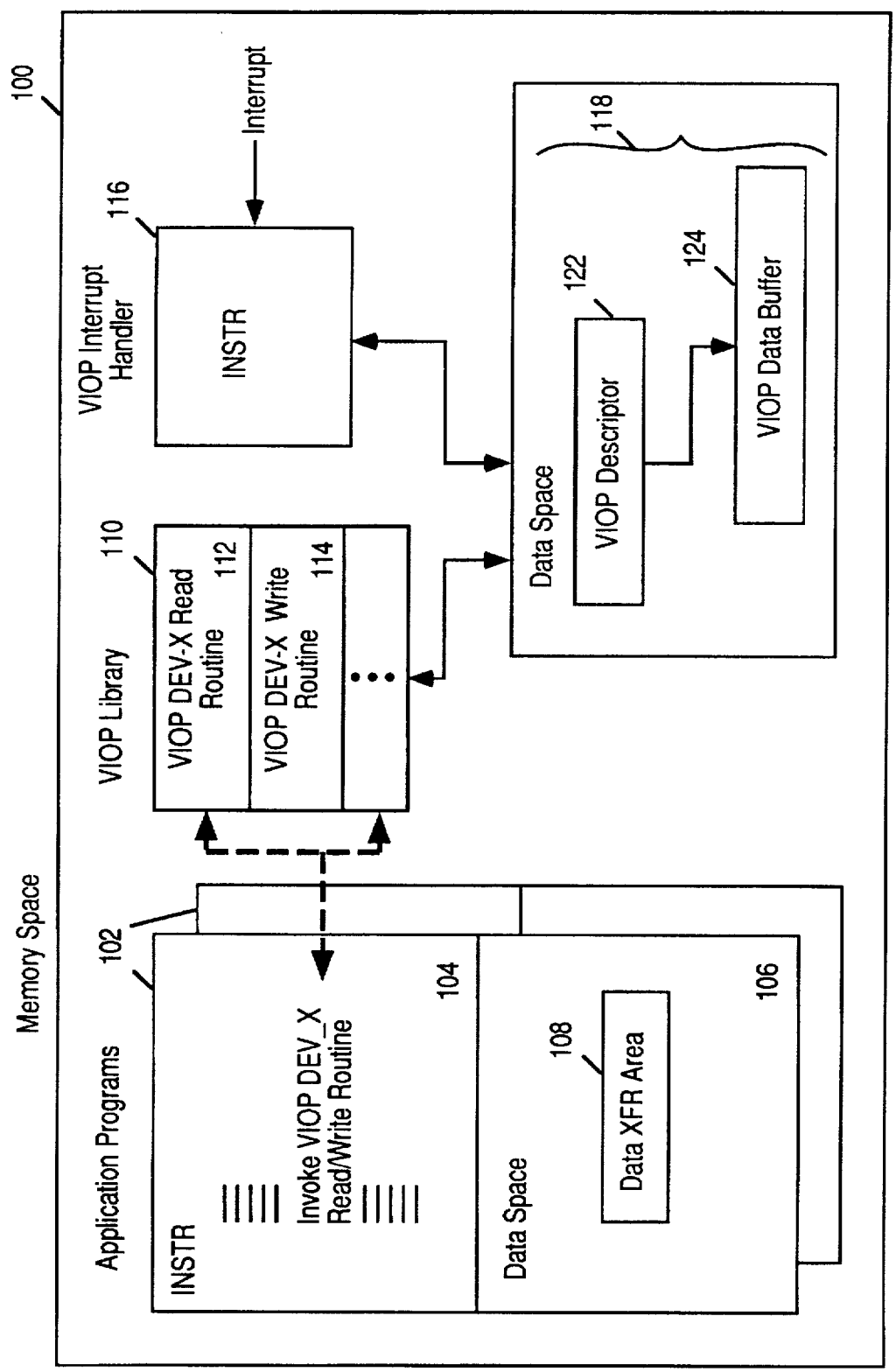
FIG. 4 illustrates the key software elements and their relationships to each other, in particular, the VIOP interrupt handler and the VIOP data structures.

Referring now to FIG. 4, a block diagram illustrating key software elements of the present invention are shown. As illustrated, the key software elements include a VIOP interrupt handler 116 and a number of VIOP data structures 118.

The VIOP interrupt handler 116 in cooperation with the VIOP interrupt facilitate returns from the PIO unit 26 at the completion of actual I/O accesses performed by the PIO unit 26. The VIOP interrupt handler 116 is invoked and given execution control through the VIOP interrupt, as described earlier. The VIOP interrupt handler 116 performs control and data management functions for programmed I/Os utilizing the VIOP data structures 118. As will be described in more detail below, in one embodiment, the VIOP interrupt handler 116 also automatically reinvokes the PIO unit 26 if a series of programmed I/Os has not been completed.

The VIOP data structures 118 facilitates the control and data management functions performed by the VIOP handler 116. One VIOP data structure 118 is used for each sequence of programmed I/Os. Each VIOP data structure 118 comprises a VIOP descriptor 122 and a VIOP data buffer 124. The VIOP descriptor 122 holds the control information for a sequence of programmed I/Os, whereas, the VIOP data buffer 124 holds the actual I/O data being transferred by the sequence of programmed I/Os between the system memory and the I/O devices.

Figure 5:
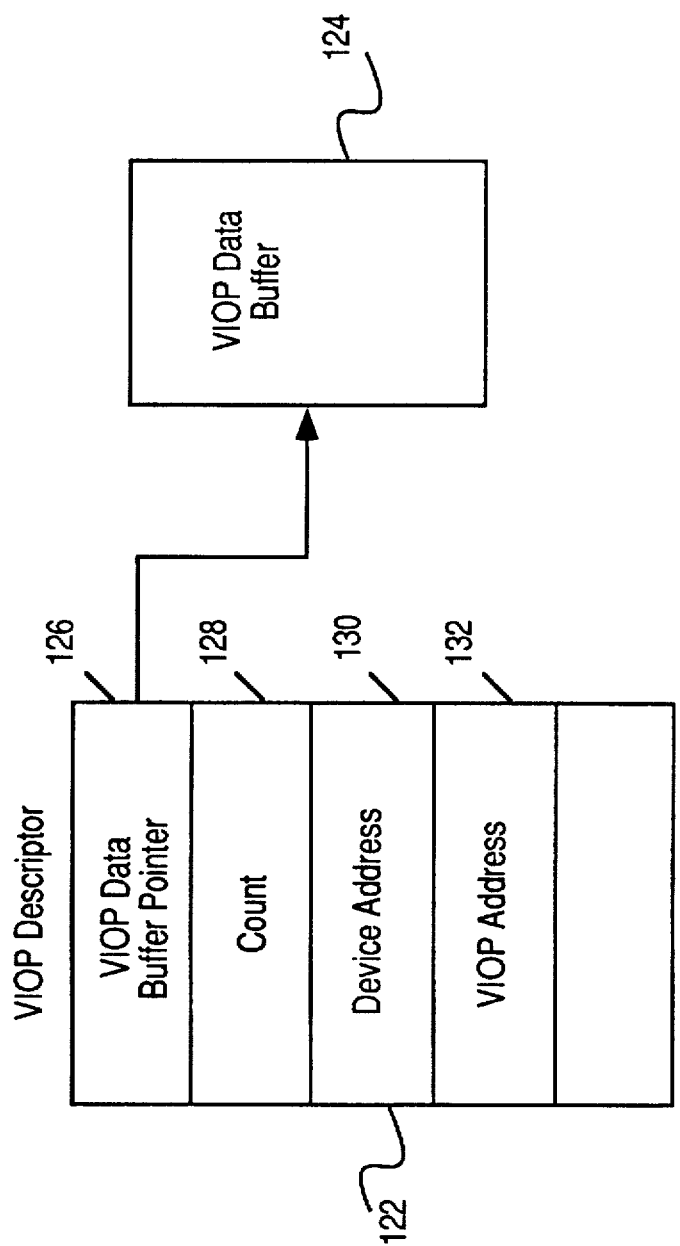
FIG. 5 illustrates one embodiment of the VIOP data structures in further detail.

Referring now to FIG. 5, a block diagram illustrating the VIOP descriptor 122 and the VIOP data buffer 124 of FIG. 4 in further detail is shown. As illustrated, a VIOP descriptor 122 comprises a VIOP data buffer pointer 126, an I/O word count 128, an I/O device address 130, and a VIOP address 132. The VIOP data buffer area pointer 126 points to a location in the VIOP data buffer area 124 where the next group of programmed I/O data are to be read or written. The I/O word count 128 keeps track of the amount of I/O data remains to be transferred by the programmed I/Os between the system memory and the target I/O device. The device address 130 points to the target I/O device against which the programmed I/Os are performed. The VIOP address 132 denotes the address of a PIO unit 26.

Referring back to FIG. 4, preferably, the software elements further include a number of VIOP library read/write routines 112 and 114. The VIOP library read and write routines 112 and 114 perform programmed I/Os against I/O devices of various device types, using the above described PIO unit 26 and its complementary facilities. Application programs 102 invoke VIOP library read/write routines 112 and 114 to access I/O devices. As will be described in more detail below, in one embodiment, the VIOP read/write routine 112 or 114 automatically reinvokes the PIO unit 26 if a series of programmed read/write I/Os has not been completed. The VIOP read and write routines 112 and 114 may be statically linkedited as integral parts of an application program 102, or they may be dynamically loaded during execution.

Having now described the individual elements of the present invention, the manner in which these elements cooperate to perform the programmed I/Os as if the programmed I/Os are executed by a dedicated I/O processor on the exemplary computer system 10 will now be described in detail with references to FIGS. 6-7.

Figure 6:
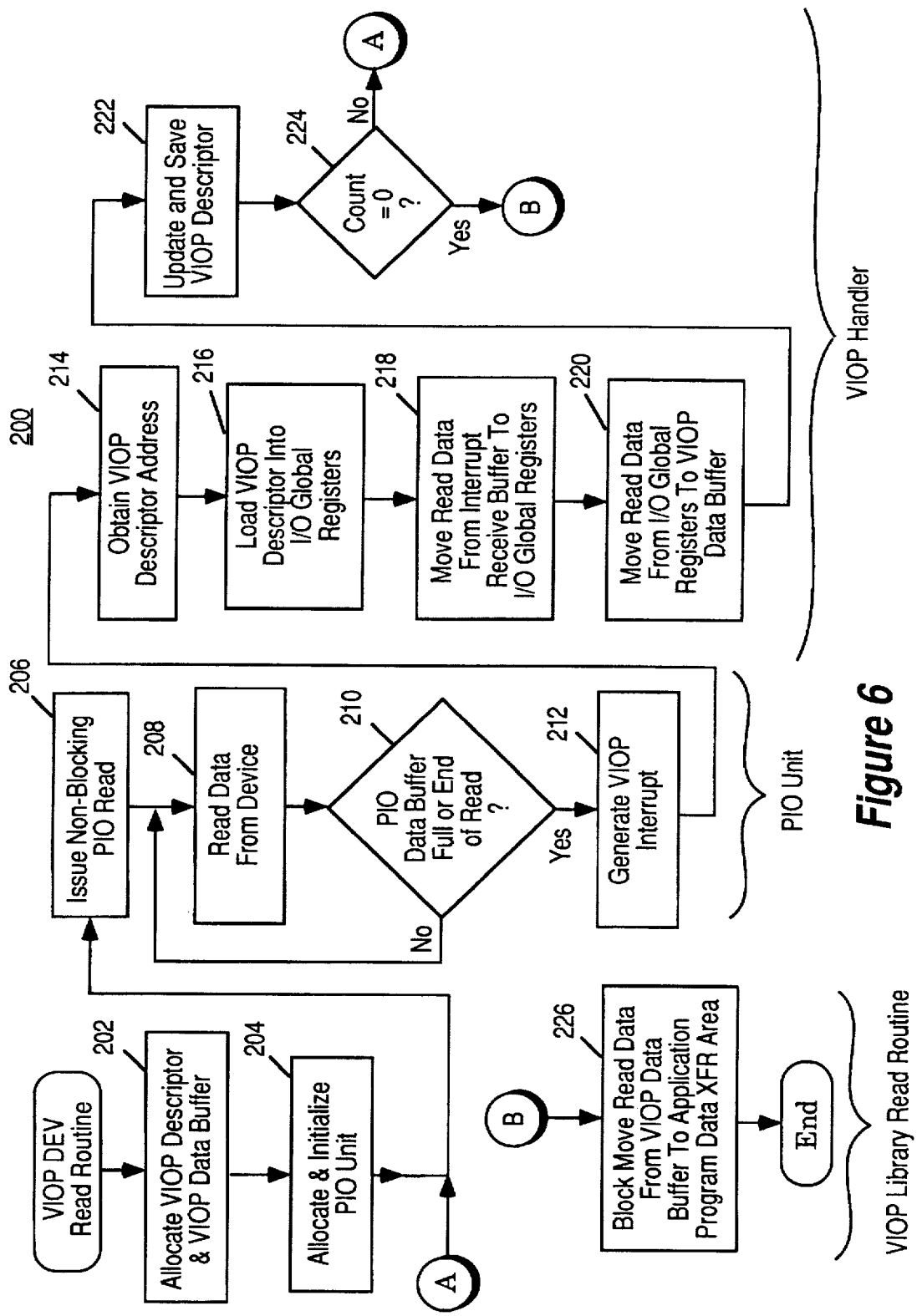
FIG. 6 illustrates the method steps of the present invention for performing a sequence of programmed I/Os for a read operation.

As illustrated in FIG. 6, invoking the VIOP library read routine 112 in an application program 102, at step 202, the VIOP library read routine 112 allocates a VIOP descriptor 122 and a VIOP data buffer area 124 in the system memory. In other words, the VIOP library read routine 112 initializes the VIOP descriptor 122 with a VIOP data buffer pointer 126 pointing to the VIOP data buffer area 124, and an I/O word count 128 denoting the amount of I/O data to be read from the target I/O device. Additionally, the VIOP library read routine 112 initializes the VIOP descriptor 122 with an I/O device address 130 locating the target I/O device where the I/O data are to be read, and an VIOP address 132 locating the PIO unit 26 for performing the programmed read I/Os. Next, at step 204, the VIOP library read routine 112 allocates the PIO unit 26 and initializes the PIO unit 26 with the proper control information, such as the device address of the target I/O device. At step 206, the VIOP library read routine 112 starts VIOP by issuing a non-blocking PIO read 206. For the purpose of this application, a non-blocking read/write instruction is a read/write instruction where the processor does not wait for the completion of the read/write operation initiated on behalf of the read/write instruction, before proceeding to execute other instructions.

Then, at step 208, the PIO unit 26 makes an actual I/O access against the target I/O device and reads a predetermined quantity of data from the target I/O device. The PIO unit 26 repeats the access against the target I/O device until the PIO data buffer 48 is full or the PIO unit 26 has read all the data as instructed by the VIOP library read routine 112, step 210. If the PIO unit 26 detects either one of these conditions, at step 212, the PIO unit 26 stops accessing the target I/O device, and generates a VIOP interrupt 37 instead. The VIOP interrupt 37 is delivered to the processor 11 through the system interconnect 15. The processor 11 stores the VIOP interrupt 37 in its Interrupt Receive Buffer 36.

Upon detecting the VIOP interrupt, the processor 11 transfers execution control to the VIOP interrupt handler 116. The VIOP interrupt handler 116 upon given execution control, obtains the VIOP descriptor address from the Interrupt Receive Buffer 36, step 214. Next, at step 216, the VIOP interrupt handler 116 loads the VIOP descriptor 122 into the dedicated I/O global registers 38. The VIOP interrupt handler 116 then moves the read data from the Interrupt Receive Buffer 36 to the dedicated I/O global registers 38, step 218, and then into the VIOP buffer 124, step 220. Upon moving the read data from the dedicated I/O global registers 38, the VIOP interrupt handler 116 updates and saves the VIOP descriptor 122, in particular, the VIOP data buffer pointer 126, and the I/O word count 128 denoting the amount of I/O data remaining to be read 128, step 222.

Next, for the illustrated embodiment, the VIOP interrupt handler 116 determines if the I/O word count 128 has reached zero denoting completion of the sequence of programmed read I/Os, step 224. If I/O word count 128 is non-zero, VIOP interrupt handler 116 automatically reinvokes the PIO unit 26 again by issuing a non-blocking PIO read 228, which in turn repeats steps 208 through 212 as described earlier. Eventually, the VIOP interrupt handler 116 will determine at step 224 that the I/O word count has reached zero. Then, the VIOP interrupt handler 116 transfers execution control to the VIOP library read routine 112, which in turn performs a block move, moving the read data from the VIOP data buffer 124 to the application program's data transfer area 108, step 226.

Alternatively, as will be appreciated by those skilled in the art, the present invention may be practiced with the VIOP interrupt handler 116 returning to the VIOP library read routine 112 after step 222, and have the VIOP library read routine 112 be responsible for reinvoking the PIO unit 26 if the sequence of programmed read I/Os has not been completed.

Figure 7:
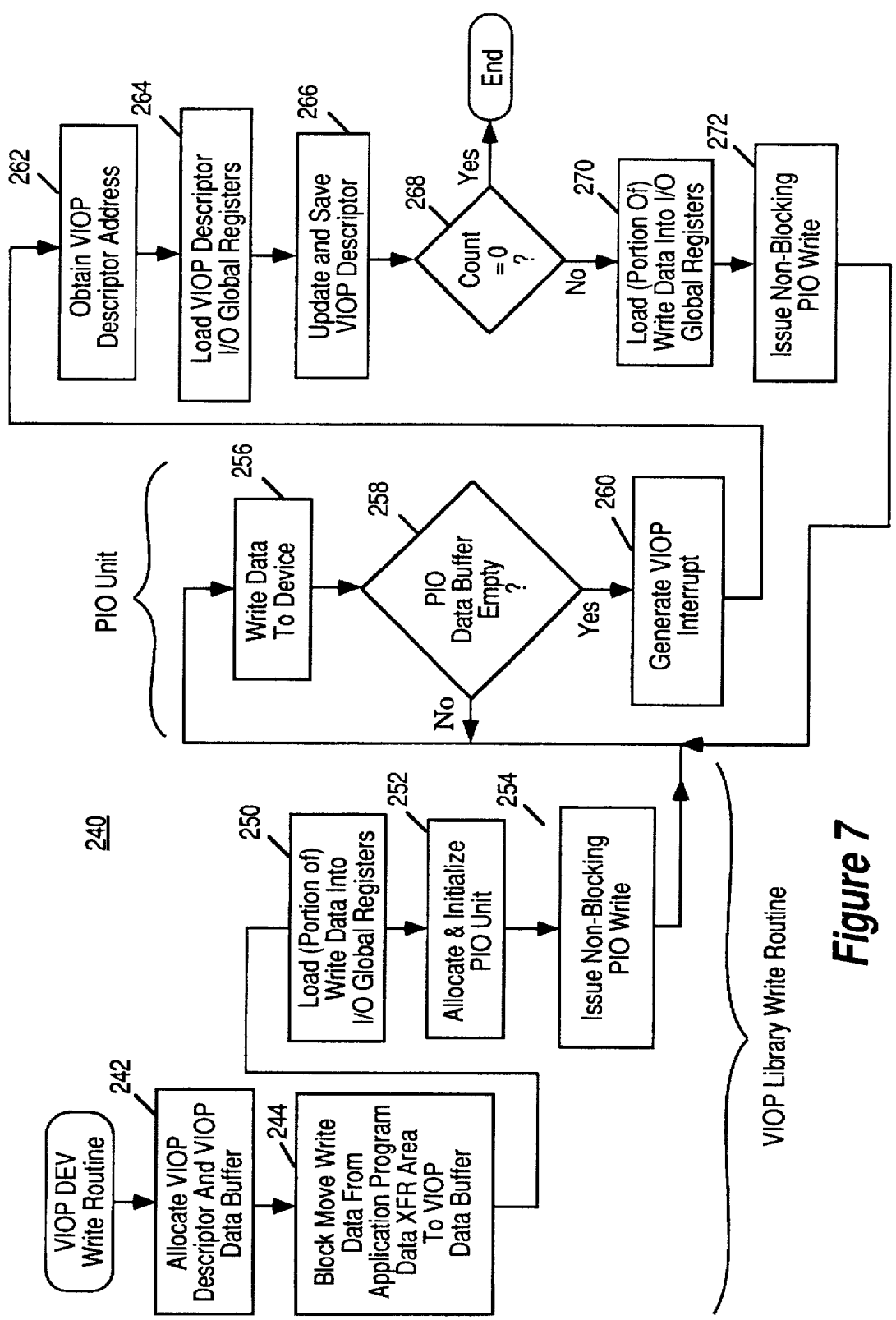
FIG. 7 illustrates the method steps of the present invention for performing a sequence of programmed I/Os for a write operation.

As illustrated in FIG. 7, upon execution of a non-blocking write instruction 103 in an application program 102, at step 242, the VIOP library write routine 114 allocates a VIOP descriptor 122 and a VIOP data buffer 124 in the system memory. In other words, the VIOP library write routine 112 initializes the VIOP descriptor 122 with a VIOP data buffer pointer 126 pointing to the VIOP data staging area 124, and an I/O word count 128 denoting the amount of I/O data to be written into the target I/O device. Additionally, the VIOP library write routine 112 initializes the VIOP descriptor 122 with an I/O device address 130 locating the target I/O device where the I/O data are to be written, and an VIOP address 132 locating the PIO unit 26 for performing the programmed write I/O.

Next, at step 244, the VIOP library write routine 114 block moves the I/O data from the application program's data transfer area 108 to the VIOP data buffer area 124. The VIOP library write routine 114 further loads portions of the write data from the VIOP data buffer area 124 into the dedicated I/O global registers 38, step 250. Then, the VIOP library write routine 114 allocates the PIO unit 26 and initializes the PIO unit 26 with the proper control information, such as the device address of the target I/O device, step 252. Upon allocating and initializing the PIO unit 26, the VIOP library write routine 114 moves the write data from the I/O global registers 38 to the PIO data buffers 48 by issuing a non-blocking PIO write, step 254.

Then, at step 256, the PIO unit 26 makes an actual I/O access against the target I/O device and writes a predetermined quantity of data to the target I/O device. The PIO unit 26 repeats the access against the target I/O device until the PIO data buffer 48 is empty or the PIO unit 26 has written all the data as instructed by the VIOP library write routine 114, step 258. If the PIO unit 26 detects either one of these conditions, at step 260, the PIO unit 26 stops accessing the target I/O device, and generates a VIOP interrupt 37 instead, step 260. The VIOP interrupt 37 is delivered to the processor 11 through the system interconnect 15. Upon receiving the interrupt, the processor 11 stores the VIOP interrupt 37 in its Interrupt Receive Buffer 36.

Upon detecting the VIOP interrupt 37, the processor 11 transfers execution control to the VIOP interrupt handler 116. The VIOP interrupt handler 116 upon given execution control, obtains the VIOP descriptor address from the Interrupt Receive Buffer 36, step 262. Next, at step 264, the VIOP interrupt handler 116 loads the VIOP descriptor 122 into the dedicated I/O global registers 38. The VIOP interrupt handler 116 then updates and saves the VIOP descriptor 122, in particular, the VIOP data staging area pointer 126, and the I/O word count 128 denoting the amount of I/O data remaining to be written, step 266.

Next, for the illustrated embodiment, the VIOP interrupt handler 116 determines if the I/O word count 128 has reached zero, denoting the programmed write I/O has been completed, step 268. If the I/O word count 128 has not reached zero, the VIOP interrupt handler 116 loads additional portions of write data into the I/O global registers 38, step 270, and then to the PIO data buffers 48 by issuing a non-blocking PIO write, step 272. Upon moving the write data to the PIO data buffers 48, VIOP interrupt handler 116 automatically reinvokes the PIO unit 26, which repeats steps 256–260 as described earlier. Eventually, the VIOP interrupt handler 116 will determine at step 268 that the I/O word count 128 has reached zero.

Alternatively, as will be appreciated by those skilled in the art, the present invention may be practiced with the VIOP interrupt handler 116 returning to the VIOP library write routine 114 after step 266, and have the VIOP library write routine 114 be responsible for reinvoking the PIO unit 26 if the sequence of programmed write I/Os has not been completed.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An apparatus comprising:
   (a) a programmable input/output (I/O) unit for transferring data to and from an I/O device;
   (b) an interrupt triggering mechanism for triggering an interrupt to interrupt execution of a processor, said interrupt being asserted by said programmable I/O unit at the end of a data transfer operation performed in association with an I/O device; and
   (c) an interrupt handler, executed by said processor and responsive to the assertion of said interrupt, including a plurality of data structures, for performing control and data management functions for a sequence of programmed I/Os being performed by a program executed by the processor, by repetitively invoking said programmable I/O unit based on said data structures, said interrupt handler being given back control when said programmable I/O unit asserts an interrupt using said interrupt triggering mechanism at the end of each data transfer operation.

2. The apparatus as set forth in claim 1, wherein said programmable I/O unit comprises:
   (a.1) a sequencer coupled to the interrupt triggering mechanism for executing predefined sequence of operations for transferring data to and from an I/O device, and asserting said interrupt at the end of a data transfer operation of an I/O device;
   (a.2) a data buffer coupled to the sequencer, the I/O device and the interrupt triggering mechanism for buffering I/O data being transferred from and to an I/O device;
   (a.3) a plurality of registers coupled to a bus interface and said sequencer for storing control and status information for said programmable I/O unit; and
   (a.4) non-blocking read/write control circuitry coupled to the sequencer and the I/O device for controlling data transfers between the data buffer and the I/O device.

3. The apparatus as set forth in claim 1, wherein,
   said data structures comprising a descriptor block and a data buffer; and
   said descriptor block comprises (c.1) a pointer pointing into said data buffer denoting where I/O data are to be read or written next.

4. The apparatus as set forth in claim 3, wherein said descriptor block further comprises:
   (c.2) an I/O data word count denoting an amount of I/O data still to be read or written for a sequence of programmed I/Os.

5. The apparatus as set forth in claim 4, wherein said descriptor block further comprises:
   (c.3) a first address locating the I/O device; and
   (c.4) a second address for locating the programmed I/O unit.

6. The apparatus as set forth in claim 1, wherein said apparatus further comprises:
   (d) a plurality of dedicated registers coupled to said programmable I/O unit for storing I/O data being transferred from or to an I/O device by said programmable I/O unit, and for storing control management data being operated on by said interrupt handler for a sequence of programmed I/Os.

7. The apparatus as set forth in claim 1, wherein said apparatus further comprises:
   (d) a read routine for performing a sequence of programmed I/Os for a read operation performed in association with an I/O device using said programmable I/O unit, interrupt, and interrupt handler; and
   (e) a write routine for performing a sequence of programmed I/Os for a write operation performed in association with an I/O device using said programmable I/O unit, interrupt, and interrupt handler.

8. The apparatus as set forth in claim 7, wherein said apparatus further comprises:
   (f) a non-blocking read operation for reading from an I/O device; and
   (g) a non-blocking write operation for writing into an I/O device;
   wherein, said read and write routines, when invoked by an application program, use said non-blocking read and write operations to read from and write into an I/O device.

9. The apparatus as set forth in claim 1, wherein,
   said programmable I/O unit is disposed in an I/O controller; and
   said processor further comprises an integer execution unit for executing integer instructions, an integer register file coupled to said integer execution unit for storing integer execution results, and a plurality of control and state registers for storing control and state information of said processor.

10. The apparatus as set forth in claim 9, wherein, said processor is disposed in a computer system; and said computer system further comprises a system interconnect coupled to said processor for transferring instructions and data, a system memory coupled to said system interconnect for storing instructions and data, and an I/O device coupled to said system interconnect for providing I/O data to said processor.

11. A computer implemented method comprising the steps of:

(a) transferring data from and to an I/O device by a programmable I/O unit for reading from or writing into said I/O device;

(b) interrupting execution of a processor by said programmable I/O unit at the end of a data transfer operation performed in association with said I/O device using an interrupt triggering mechanism; and (c) responding to said interrupt by an interrupt handler executed by said processor, said interrupt handler having a plurality of data structures to perform control and data management functions for a sequence of programmed I/Os being performed by a program executed by the processor by repetitively invoking said programmable I/O unit based on said data structures, said interrupt handler being given back control when said programmable I/O unit asserts an interrupt using said interrupt triggering mechanism at the end of each data transfer operation.

12. The method as set forth in claim 11, wherein said performance of control and data management functions by said interrupt handler in said step (c) further comprises maintaining control data information in a descriptor block and a data buffer of the data structure, including maintaining a pointer in said descriptor block pointing into said data buffer denoting where I/O data are to be read from or written to next.

13. The method as set forth in claim 12, wherein said maintenance of control data information in said data structure further includes maintaining an I/O data word count in said descriptor block denoting an amount of I/O data still to be read or written for a sequence of programmed I/Os, maintaining a first address locating the I/O device, and maintaining a second address locating the programmed I/O unit.

14. The method as set forth in claim 11, wherein said step (a) further comprises invoking a read routine from an application program for performing a sequence of programmed I/Os in association with an I/O device invoking said programmable I/O unit, interrupt, and said interrupt handler.

15. The method as set forth in claim 11, wherein said step (a) further comprises invoking a write routine from an application program for performing a sequence of programmed I/Os in association with an I/O device invoking said programmable I/O unit, interrupt, and interrupt handler.

16. A method for providing programmed input/output (I/O) capability to a computer system comprising the steps of:

(a) providing a programmable input/output unit to said computer system for transferring data to and from an I/O device of said computer system;

(b) providing an interrupt triggering mechanism for triggering an interrupt to interrupt a processor of said computer system, said interrupt being asserted by said programmable I/O unit at the end of a data transfer operation performed in association with an I/O device; and (c) providing an interrupt handler having a plurality of data structures to be executed by said processor and responsive to the assertion of said interrupt for performing control and data management functions for a sequence of programmed I/Os being performed by a program executed by the processor by repetitively invoking said programmable I/O unit based on said data structures, returning control to said interrupt handler when said programmable I/O unit asserts an interrupt using said interrupt triggering mechanism at the end of each data transfer operation.

17. The method as set forth in claim 16, wherein said step (a) comprises the steps of:

(a.1) providing a sequencer coupled to an interrupt triggering mechanism for executing predefined sequence of operations for transferring data from and to an I/O device, and asserting an interrupt at the end of a data transfer operation performed in association with the I/O device;

(a.2) providing a data buffer coupled to the sequencer and the interrupt triggering mechanism for buffering I/O data being transferred from and to the I/O device;

(a.3) providing a plurality of registers coupled to a bus interface and said sequencer for storing control and status information for said programmable I/O unit; and (a.4) providing non-blocking read/write circuitry coupled to the sequencer and the I/O device for controlling data transfers between the data buffer and the I/O device.

18. The method as set forth in claim 16, wherein said method further comprises the steps of:

(d) providing a plurality of dedicated registers coupled to said programmable I/O unit for storing I/O data being transferred from or to an I/O device by said programmable I/O unit, and for storing control management data being operated on by said interrupt handler for a sequence of programmed I/Os.

19. The method as set forth in claim 16, wherein said method further comprises the steps of:

(d) providing a read routine for performing a sequence of programmed read I/Os performed in association with an I/O device invoking said programmable I/O unit, interrupt, and interrupt handler; and (e) providing a write routine for performing a sequence of programmed write I/Os performed in association with an I/O device using said programmable I/O unit, interrupt, and interrupt handler.

20. The method as set forth in claim 19, wherein said method further comprises the steps of:

(f) providing a non-blocking read operation for reading from an I/O device; and (g) providing a non-blocking write operation for writing into an I/O device;

wherein, said read and write routines, when invoked by an application program, use said non-blocking read and write operations to read from and write into an I/O device.

* * * * *